United States Patent
Fastring (10) Patent No.: US 8,874,929 B2
(45) Date of Patent: Oct. 28, 2014

(54) CROSS DOMAIN DISCOVERY

(75) Inventor: Richard Arthur Fastring, El Cajon, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 993 days.

(21) Appl. No.: 12/588,756

(22) Filed: Oct. 27, 2009

(65) Prior Publication Data

US 2011/0099203 A1    Apr. 28, 2011

(51) Int. Cl.
*G06F 12/14*     (2006.01)
*H04L 9/08*      (2006.01)
*G06F 17/30*     (2006.01)
*H04L 9/32*      (2006.01)

(52) U.S. Cl.
CPC ........ *H04L 9/0825* (2013.01); *G06F 17/30256* (2013.01); *G06F 17/30607* (2013.01); *H04L 9/3247* (2013.01)
USPC ............ 713/189; 713/193; 707/785; 707/783

(58) Field of Classification Search
None
See application file for complete search history.

(56) References Cited

U.S. PATENT DOCUMENTS

| | | | |
|---|---|---|---|
| 5,956,403 A * | 9/1999 | Lipner et al. | 713/181 |
| 2004/0022390 A1 | 2/2004 | McDonald et al. | |
| 2006/0053095 A1 * | 3/2006 | Koch et al. | 707/3 |
| 2006/0080316 A1 * | 4/2006 | Gilmore et al. | 707/9 |
| 2006/0253833 A1 * | 11/2006 | Blagojevic et al. | 717/107 |
| 2008/0263363 A1 * | 10/2008 | Jueneman et al. | 713/184 |
| 2009/0089262 A1 * | 4/2009 | Cheng et al. | 707/3 |
| 2011/0078774 A1 * | 3/2011 | Grube et al. | 726/5 |

\* cited by examiner

*Primary Examiner* — Alexander Lagor
(74) *Attorney, Agent, or Firm* — Oblon, Spivak, McClelland, Maier & Neustadt, L.L.P.

(57) ABSTRACT

Aspects of the disclosure provide methods and systems for cross domain discovery. According to the disclosure, an object can include multiple entities defined by an originator. The multiple entities have different scopes corresponding to different access restrictions. Further, the originator defines keywords for each of the multiple entities. A system for cross domain discovery stores the multiple entities in an object service component, and stores the keywords and access restrictions in a search service component. The search service component conducts a search based on the keywords and access restrictions in response to a search request from a user. An entity is provided to the user based on the user's credential and the searching.

16 Claims, 6 Drawing Sheets

CROSS DOMAIN DISCOVERY

BACKGROUND

Information may need protection and sharing. In a health care example, a patient record includes confidential information and needs to be protected. On the other hand, various agencies, such as doctor, pharmacist, insurance company, and the like, need to access the patient record in order to provide appropriate services. In a homeland security example, a watch list can be highly classified for FBI internal use. However, other agencies may have a need to know.

SUMMARY

Aspects of the disclosure can provide methods and systems for cross domain discovery. According to the disclosure, an object can include multiple entities defined by an originator. The multiple entities can have different scopes corresponding to different access restrictions. Further, the originator can define keywords for each of the multiple entities. A system for cross domain discovery can store the multiple entities in an object service component, and store the keywords and access restrictions in a search service component. The search service component can conduct a search based on the keywords and access restrictions in response to a search request from a user. An entity can be provided to the user based on the user's credential and the search result.

A method for searching can include storing first keywords in association with a first entity of an object, and second keywords in association with a second entity of the object by a search service component. The first entity can have a first restriction level and the second entity can have a second restriction level. Further, the method can include determining that a search request having the first restriction level matches the first keywords by the search service component, and responding to the searching request with the first entity.

To store the keywords, the method can include storing the first keywords and the second keywords in a hash table. Further, the method can include determining the search request being authorized by a policy service component. In addition, the method can include determining the search request having the first restriction level based on a credential of an originator of the search request.

To respond to the search request with the first entity, the method can include creating a hit entry including a reference to the object stored in an object service component.

According to aspects of the disclosure, a method for searching can include storing an object having a first entity with a first restriction level and a second entity with a second restriction level in an object service component, and transmitting first keywords in association with the first entity and second keywords in association with the second entity to a search service component. The search service component can store the first keywords and the second keywords, determine a search request having the first restriction level matching the first keywords and create a hit entry including a reference to the first entity stored in the object service component.

To store the object, the method can include encrypting the first entity using a first symmetric key, storing the encrypted first entity in the object service component, encrypting the second entity using a second symmetric key, and storing the encrypted second entity in the object service component.

Further, the method can include obtaining the first symmetric key and the second symmetric key in association with the object. In addition, the method can include splitting the first symmetric key into a first key split and a second key split, and splitting the second symmetric key into a third key split and a fourth key split.

Subsequently, the method can include encrypting the first key split and the third key split using a public key of a first asymmetric key pair belonging to the object service, and encrypting the second key split and the fourth key split using a public key of a second asymmetric key pair belonging to the policy service.

Additionally, the method can include transmitting the encrypted first key split, the encrypted second key split, the encrypted third key split and the encrypted fourth key split to the search service component, and deleting from the object service component information of the first key split, the second key split, the third key split and the fourth key split. In an example, the method deletes from the object service component the plaintext first key split, the plaintext second key split, the plaintext third key split, and the plaintext fourth key split.

Accordingly, when retrieving the first entity, the method can include decrypting the encrypted first key split using a private key of the first asymmetric key pair belonging to the object service. In addition, the method can include receiving a re-encrypted second key split and decrypting the re-encrypted second key split using a private key of the first asymmetric key pair belonging to the object service. The re-encrypted second key split is generated by decrypting the encrypted second key split using a private key of the second asymmetric key pair belonging to the policy service, and re-encrypting the second key split using the public key of the first asymmetric key pair belonging to the object service component.

Further, the method can include combining the decrypted first key split and the decrypted second key split to recover the first symmetric key, and decrypting the encrypted first entity using the recovered first symmetric key.

Aspects of the disclosure can provide a system for cross domain discovery. The system can include an object service component configured to store an object having a first entity with a first restriction level and a second entity with a second restriction level, and a search service component configured to store first keywords in association with the first entity, and second keywords in association with the second entity, determine a search request having the first restriction level matching the first keywords, and respond to the search request with the first entity stored in the object service component. In an embodiment, the search service component can include a hash table configured to store at least one of the first keywords and the second keywords.

Further, the system can include a policy service component configured to authorize the search request. In addition, the system can include a user service component configured to receive the search request from a user, and associate a credential of the user with the search request. In an embodiment, the system can include a key service component configured to generate a first symmetric key and a second symmetric key in association with the object. The object service component is further configured to encrypt the first entity using the first symmetric key, encrypt the second entity using a second symmetric key, split the first symmetric key into a first key split and a second key split, split the second symmetric key into a third key split and a fourth key split, encrypt the first key split and the third key split using a public key of a first asymmetric key pair belonging to the object service, and encrypt the second key split and the fourth key split using a public key of a second asymmetric key pair belonging to the policy service.

Further, the object service component is configured to transmit the encrypted first key split, the encrypted second key split, the encrypted third key split and the encrypted fourth key split to the search service component, and delete information of the first key split, the second key split, the third key split and the fourth key split. In an example, the object service component deletes the plaintext first key split, the plaintext second key split, the plaintext third key split and the plaintext fourth key split.

In addition, the object service component is configured to decrypt the encrypted first key split using a private key of the first asymmetric key pair belonging to the object service, and receive a re-encrypted second key split. The re-encrypted second key split is generated by decrypting the encrypted second key split using a private key of the second asymmetric key pair belonging to the policy service, and re-encrypting the second key split using the public key of the first asymmetric key pair belonging to the object service component. The object service component can then decrypt the re-encrypted second key split using the private key of the first asymmetric key pair belonging to the object service, combine the decrypted first key split and the decrypted second key split to recover the first symmetric key, and decrypt the encrypted first entity using the recovered first symmetric key.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
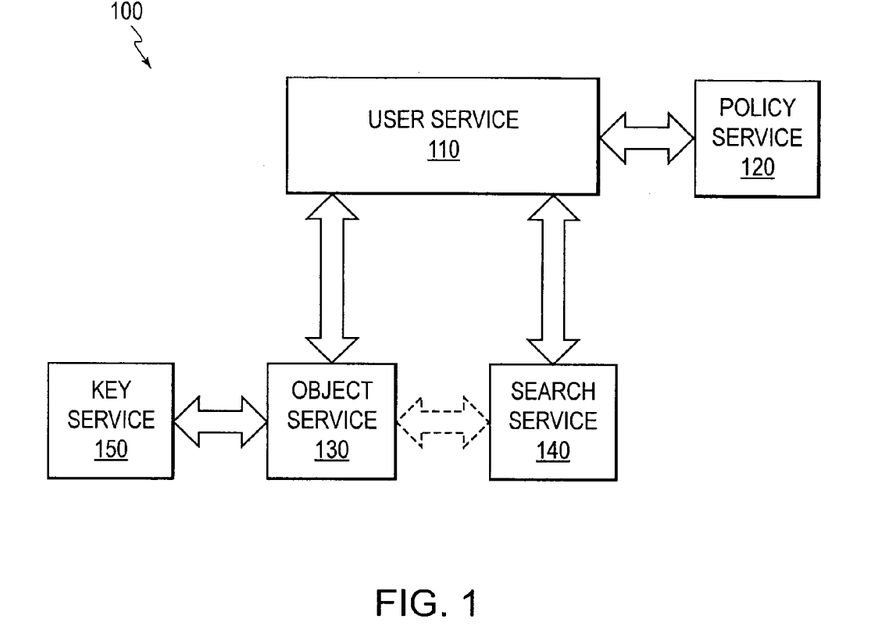
FIG. 1 shows a cross domain discovery (CDD) system according to an embodiment of the disclosure.

FIG. 1 shows a cross domain discovery (CDD) system 100 according to an embodiment of the disclosure. The CDD system 100 can include a user service (uSvc) component 110, a policy service (pSvc) component 120, an object service (oSvc) component 130, a search service (sSvc) component 140, and a key service (kSvc) component 150. These service components can be suitably coupled together as shown in FIG. 1.

Communications between the service components can be protected via any suitable mechanism, such as high assurance internet protocol encryptor (HAIPE) channels, public key cryptography, and the like.

In an embodiment, communications between two service components can be protected by different mechanisms based on packet size, such as using public key cryptography for small hand shake packet, using session key for large object packet. For example, the uSvc component 110 wants to send a small packet to the pSvc component 120. The pSvc component 120 has an asymmetric key pair including a private key and a public key. The private key is kept privately by the pSvc component 120, and the public key is distributed to other service components in the CDD system 100. The uSvc component 110 can encrypt the small packet using the public key of the pSvc component 120, and then send the encrypted small packet. Because the private key is kept privately by the pSvc component 120, the encrypted small packet can be decrypted by the pSvc component 120. Other service components, or intruders do not have the private key of the pSvc component 120, thus can not decrypt the encrypted small packet. In another example, when the uSvc component 110 wants to send a large packet to the oSvc component 130. The uSvc component 110 and the oSvc component 130 can first use the public key cryptography to set up a symmetric session key. Then, the uSvc component 110 uses the symmetric session key to encrypt the large packet, and sends the encrypted large packet to the oSvc component 130. When the oSvc component 130 receives the encrypted large packet, the oSvc component 130 can use the symmetric session key to decrypt the large packet.

In another embodiment, communications between two service components can be digitally signed by the sending service component. For example, communications from the uSvc component 110 to other service components can be digitally signed by the uSvc component 110. More specifically, the uSvc component 110 has an asymmetric key pair including a private key and a public key. The private key is kept by the uSvc component 110, while the public key is distributed to the other service components in the CDD system 100. The uSvc component 110 can encrypt, for example, an authentication assertion, using the private key to digitally sign the authentication assertion. When another service component receives the signed authentication assertion, and successfully decrypts the authentication assertion using the public key of the uSvc component 110, the other service component verifies that the authentication assertion comes from the uSvc component 110.

The uSvc component 110 can be a trusted service that supports CDD activities on behalf of a user. Communications between the user, the uSvc component 110 and the rest of the CDD services can be protected via any suitable mechanism, such as high assurance internet protocol encryptor (HAIPE) channels, public key cryptography, and the like.

The uSvc component 110 can perform identification and authentication (I&A) for a user. More specifically, the uSvc component 110 can receive a credential of a user, such as user login information, and the like, and create a user authentication assertion based on the credential. Further, the uSvc component 110 can receive and process user requests to the CDD system 100, such as uploading request, search request, retrieval request, and the like. Further, the uSvc component 110 can perform anti-virus checking and/or other malware-checking on the user requests. In addition, the uSvc component 110 can attach the user authentication assertion with the user requests. Then, the uSvc component 110 can send the user request to the pSvc component 120.

In an uploading example, a user can send an uploading request to the uSvc component 110. The uploading request can include an object unit having multiple entities. The multiple entities correspond to multiple domains having different scopes.

In an example, an object unit can include an object entity, a bibliographic entity, and an existence entity. The object entity has a scope of the object itself, such as a whole file. The bibliographic entity has a scope of title, author, publisher, date, and the like, of the file. The existence entity has a scope of a contact for the file, such as name, phone number and email address of a person that can discuss the file. Further, the object unit can include keywords associated with the multiple entities. For example, the object unit can include keywords associated with the object entity, keywords associated with the bibliographic entity, and keywords associated with the existence entity. In addition, the object unit can include access restrictions. The access restrictions can specify restrictions for accessing the multiple entities. For example, the access restrictions can specify an object level of access, a bibliographic level of access, and an existence level of access. The multiple entities, the keywords, and the access restrictions can be suitably defined by the user.

In a medical record example, a patient record can include a first entity for doctor, a second entity for pharmacist, and a third entity for insurance company. Each entity includes a segment of the patient record that is necessary for corresponding agency to provide appropriate services. The access restrictions can specify respective agency requirements for accessing the multiple entities.

In the uploading example, when the user sends the uploading request to the uSvc component 110, the uSvc component 110 digitally signs and forwards the uploading request to the pSvc component 120 along with the user authentication assertion. In addition, the uSvc component 110 can perform virus checking on the object unit that the user desires to upload and can include a virus-checked certification in the uploading request. The pSvc component 120 can return an uploading authorization assertion in response to the uploading request.

When the uSvc component 110 receives the uploading authorization assertion from the pSvc component 110, the uSvc component can generate an object identification and can create a composite object structure. The object identification can be a random number or a pseudo random number. In an embodiment, the composite object structure can include the object identification, the object entity, the object entity keywords, the bibliographic entity, the bibliographic entity keywords, the existence entity, the existence entity keywords and the access restrictions.

The uSvc component 110 can digitally sign the composite object structure. Further, the uSvc component 110 can forward an uploading package to the oSvc component 130. The uploading package can include the uploading request, the uploading authorization assertion and the signed composite object structure. According to an aspect of the disclosure, the uSvc component 110 may encrypt the uploading package with a session key obtained from the kSvc component 150.

In an embodiment, the uSvc component 110 can receive an object identification collision indication from the oSvc component 130 in response to the uploading package. The uSvc component can generate a new object identification, update the uploading package with the new object identification, and resend the uploading package.

In a search example, a user can send a search request having a search criteria to the uSvc component 110. The uSvc component 110 can digitally sign and forward the search request to the pSvc component 120 along with the user authentication assertion. In addition, the uSvc component 110 can perform virus checking on the search criteria and can include a virus-checked certification in the search request. The pSvc component 120 can return a search authorization assertion in response to the search request.

When the uSvc component 110 receives the search authorization assertion from the pSvc component 120, the uSvc component 110 can forward the search request, the search authorization assertion, and the user authentication assertion, for example, in a package, to sSvc component 140. The sSvc component 140 can conduct a search, and return a hit list. The hit list can include a plurality of hit entries. Each hit entry may include a reference to an entity of a composite object structure stored in the CDD system 100.

When the uSvc component 110 receives the hit list from the sSvc component 140, the uSvc component 110 can process the hit list, and forward the processed hit list to the user. In an embodiment, the hit list from the sSvc component 140 can include information about keys, such as encrypted key splits. The uSvc component 110 can filter out the information about keys, and provide the filtered hit list to the user.

In a retrieval example, a user can retrieve an entity corresponding to a hit entry on a hit list. Each hit entry on the hit list can be identified by an object identification. When the user selects an entry, the uSvc component 110 can receive an object identification corresponding to the selected entry. Then, the uSvc component 110 can generate and send a retrieval request to the pSvc component 120. The retrieval request can include the object identification, the user authentication assertion, and key splits information. The pSvc component 120 can return a digitally signed retrieval authorization assertion in response to the retrieval request.

When the uSvc component 110 receives the digitally signed retrieval authentication assertion from the pSvc component 120, the uSvc component 110 can send the retrieval authentication assertion and the retrieval request to the oSvc component 130. The oSvc component 130 can return a plaintext version of a retrieved entity in response to the retrieval request.

When the uSvc component 110 receives the plaintext version of the retrieved entity, the uSvc component 110 can forward the plaintext version of the retrieved entity to the user.

The uSvc component 110 can be implemented by various ways. In an example, the uSvc component 110 can be implemented as a hardware element within a user terminal, such as a computer. In another example, the uSvc component 110 can be implemented as an external piece of hardware, and can be suitably coupled to a user terminal. In another example, the uSvc component 110 can be implemented as trusted software instructions that can be executed by a processor within a user terminal. It is also noted that the uSvc component 110 can a distributed component. A user terminal coupled to the CDD system 100 may have a respective uSvc component 110.

The pSvc component 120 can be a trusted service that performs access control for the CDD system 100. Communications between the pSvc component 120 and the rest of the CDD system 100 can be protected via any suitable mechanism, such as HAIPE channels, public key cryptography, and the like. The pSvc component 120 has an asymmetric key pair including a private key and a public key. The private key is kept privately at the pSvc component 120, and the public key is distributed to the other service components in the CDD system 100.

The pSvc component 120 can establish a CDD policy, store the CDD policy, and update the CDD policy. Further, the pSvc component 120 can use the CDD policy to authorize various accesses to the CDD system 100, such as uploading access, search access, retrieval access, and the like.

In an uploading example, the pSvc component 120 can determine an uploading authorization assertion for a user to upload an object into the CDD system 100. More specifically, the pSvc component 120 can receive an uploading request from the uSvc component 110. The uploading request can include an object unit for uploading, and a digitally signed user authentication assertion by the uSvc component 110. The pSvc component 120 can compare the user authentication assertion and the uploading request with current object uploading policy of the CDD system 100, and make an uploading decision. The uploading decision can be made based on the user's credential and the access restrictions of the object unit. In an embodiment, the uploading decision is made additionally based on the existence of a virus-checked assertion within the user authentication assertion. In another embodiment, the uploading decision is made additionally based on a comparison of object entity keywords, bibliographic entity keywords and existence entity keywords with acceptable keyword lists and dirty word lists. In another embodiment, the uploading decision is made additionally based on a comparison of a point of contact in the existence entity with lists of approved point of contacts. It is noted that the uploading decision can be made based on other suitable condition, such as the current information operation condition (INFOCON), and the like.

The pSvc component 120 can create and return a digitally signed uploading authorization assertion to the uSvc component 110 in accordance with the uploading decision. The digitally signed uploading authorization assertion can permit or deny the uploading request. In an embodiment, the uploading authorization assertion specifies a time period during which the uploading needs to be accomplished.

In a search example, the pSvc component 120 can determine a search authorization assertion for a user to search for objects stored in the CDD system 100. More specifically, the pSvc component 120 can receive a search request with a digitally signed user authentication assertion from the uSvc component 110. The pSvc component 120 can compare the user authentication assertion and the search request with current search policy and make a search decision. The search decision is made based on the user's credentials. In an embodiment, the search decision is made additionally based on an existence of a virus-checked assertion within the user authentication assertion. In another embodiment, the search decision is made based on a comparison of search keywords with acceptable keyword lists and dirty word lists. It is noted that the search decision can be made based on other suitable condition, such as the current information operations condition (INFOCON).

The pSvc component 120 can create and return a digitally signed search authorization assertion in accordance with the search decision. The search authorization assertion can permit, deny or modify the search request. In an embodiment, the search authorization assertion specifies a time period during which the search needs to be accomplished.

In a retrieval example, the pSvc component 120 can determine a retrieval authorization assertion for a user to retrieve objects from the CDD system 100. More specifically, the pSvc component 120 receives a retrieval request with a user authentication assertion from the uSvc component 110. The retrieval request can be digitally signed by the uSvc component 110. The retrieval request can include the object identification, the access restrictions, key splits information, and the like. The retrieval request, or a portion of the retrieval request can be suitably encrypted. For example, the access restrictions can be encrypted, for example, by a symmetric key.

The pSvc component 120 can decrypt, for example, the access restrictions. Then, the pSvc component 120 can compare the user authentication assertion and the retrieval request with current retrieval policy and make a retrieval decision. The retrieval decision is made based on the user credentials, the access restrictions of the object. It is noted that the retrieval decision can be made based on other suitable condition, such as the current information operations condition (INFOCON), and the like.

Additionally, the pSvc component 120 can suitably enable encryption key recovering. In an embodiment, an entity of the object unit can be encrypted using an encryption key. The encryption key can be split into a first key split and a second key split. The first key split can be encrypted using the public key of the pSvc component 120, and the second key split can be encrypted using the public key of the oSvc component 130. When the retrieval decision indicates that the user can obtain the entity of object unit, the pSvc component 120 can decrypt the first key split using the private key of the pSvc component 120 and re-encrypt the first key split using the public key of the oSvc component 130. It is noted that the first key split and the second key split can then be decrypted by the oSvc component 130 using the private key of the oSvc component 130. Thus, the oSvc component 130 is able to recover the encryption key.

The pSvc component 120 can create and return a retrieval authorization assertion in accordance with the retrieval decision to the uSvc component 110. The retrieval authorization assertion can permit, deny or modify the retrieval request. It is noted that the retrieval authorization assertion can include the first key split and the second key split that are encrypted by the public key of the oSvc component 130.

In an embodiment, the retrieval authorization assertion specifies a time interval during which the retrieval needs to be completed.

The pSvc component 120 can be implemented in various ways, such as a hardware element within a computer, software instructions executed by a computer, and the like. In an embodiment, the pSvc component 120 can be implemented in a computer that does not include the uSvc component 110 or the oSvc component 130.

The oSvc component 130 can be a trusted service that can perform encryption and decryption. In addition, the oSvc component 130 can include a storage for storing the object units having multiple entities. Communications between the oSvc component 130 and the rest of the CDD system 100 can be protected via any suitable mechanism, such as HAIPE channels, public key cryptography, and the like. The oSvc component 130 has an asymmetric key pair including a public key and a private key. The private key is kept privately at the oSvc component 130, and the public key is distributed to the other service components in the CDD system 100.

The oSvc component 130 can respond to uploading requests and retrieval requests. In an uploading example, the oSvc component 130 receives an uploading request accompanied by a digitally signed uploading authorization assertion and a digitally signed composite object structure.

The oSvc component 130 can perform various checks. In an embodiment, the oSvc component 130 checks the uploading authorization assertion, for example, by decrypting the digitally signed uploading authorization assertion with the public key of the pSvc component 120. When the uploading request lacks a valid uploading authorization assertion signed by the pSvc component 120, the oSvc component 130 does not respond to the uploading request.

In another embodiment, the oSvc component 130 checks a time period specified by the uploading authorization assertion. The oSvc component 130 may not respond to the uploading request when the current time falls outside the time period specified in the uploading authorization assertion.

The oSvc component 130 can also detect potential object identification collisions. When the oSvc component 130 detects that the object identification has been used, the oSvc component 130 can notify the uSvc component 110 to send a new uploading request with a new object identification.

The oSvc component 130 can obtain various encryption keys from the kSvc component 150 and suitably encrypt the received composite object structure. In an embodiment, the oSvc component 130 obtains keys respectively for each entity of the composite object structure. For example, when the received composite object structure includes an object entity, a bibliographic entity, and an existence entity, the oSvc component 130 can obtain an object entity encryption key (OEK), a bibliographic entity encryption key (BEK), and an existence entity encryption key (EEK). The OEK, the BEK and the EEK can be different.

The OEK, the BEK, and the EEK can be symmetric encryption keys. The oSvc component 130 can use the OEK to encrypt the object entity, use the BEK to encrypt the bibliographic entity, and use the EEK to encrypt the existence entity. The metadata of the composite object structure can include the keywords for the object entity, the keywords for the bibliographic entity, the keywords for the existence entity, and the access restrictions. Then, the oSvc component 130 can suitably store the encrypted composite object structure. It is noted that the oSvc component 130 may store the encrypted composite object structure in multiple distributed storage locations.

Further, the oSvc component 130 can generate key splits. In an embodiment, the oSvc component 130 can generate a pSvc key split and an oSvc key split for each of the OEK, the BEK and the EEK. In an example, the oSvc component 130 can obtain three random numbers R_OEK, R_BEK, and R_EEK corresponding to the OEK, the BEK and the EEK. A random number and its corresponding encryption key can have the same length. Then, the oSvc component 130 can generate the pSvc key splits (OEK_P, BEK_P, and EEK_P) and the oSvc key splits (OEK_O, BEK_O, and EEK_O) based on the random numbers. In an example, the oSvc component 130 can generate the key splits using XOR operation, as shown in Eq. 1-6.

$$OEK\_P = R\_OEK \qquad (Eq.\ 1)$$

$$OEK\_O = R\_OEK\ XOR\ OEK \qquad (Eq.\ 2)$$

$$BEK\_P = R\_BEK \qquad (Eq.\ 3)$$

$$BEK\_O = R\_BEK\ XOR\ BEK \qquad (Eq.\ 4)$$

$$EEK\_P = R\_EEK, \qquad (Eq.\ 5)$$

$$EEK\_O = R\_EEK\ XOR\ EEK \qquad (Eq.\ 6)$$

Subsequently, the oSvc component 130 can encrypt the pSvc key splits OEK_P, BEK_P and EEK_P with the public key of the pSvc component 120, and encrypt the oSvc key splits OEK_O, BEK_O and EEK_O with the public key of the oSvc component 130. Additionally, the oSvc component 130 can combine the object identification, the metadata, and the encrypted pSvc key splits and the encrypted oSvc key splits, and send the combination to the sSvc component 140 as a search entry. In an embodiment, the oSvc component 130 can send the combination directly to the sSvc component 140. In another embodiment, the oSvc component 130 can send the combination to the sSvc component 140 via the uSvc component 110.

It is also noted that the oSvc component 130 can zeroize the OEK, the BEK, the EEK, the OEK_P, the BEK_P, the EEK_P, the OEK_O, the BEK_O, and the EEK_O. Thus, the oSvc component 130 does not have a copy of the OEK, the BEK, the EEK, the OEK_P, the BEK_P, the EEK_P, the OEK_O, the BEK_O, and the EEK_O.

In a retrieval example, the oSvc component 130 receives a retrieval request from the uSvc component 110. The retrieval request can include a digitally signed retrieval authorization assertion by the pSvc component 120 and a digitally signed user authentication assertion by the uSvc component 110. In addition, the retrieval request can include the object identification and a subset of key splits. In an embodiment, the subset of key splits can include a first key split and a second key split encrypted by the public key of the oSvc component 130.

The oSvc component 130 can check the validity of the retrieval request. In an embodiment, the oSvc component 130 can check the user authentication assertion and the retrieval authorization assertion. The oSvc component 130 may not process the retrieval request if the retrieval authorization assertion is not signed by the pSvc component 120 or the user authentication assertion is not signed by the uSvc component 110. In another embodiment, the oSvc component 130 can check the time period specified in the retrieval authorization assertion.

Further, the oSvc component 130 can decrypt the key splits in the retrieval authorization assertion. In an example, the oSvc component 130 can receive the encrypted OEK_O and OEK_P for retrieving the object entity, the encrypted BEK_O and BEK_P for retrieving the bibliographic entity, and/or the encrypted EEK_O and EEK_P for retrieving the existence entity. The key splits are encrypted by the public key of the oSvc component 130 when the retrieval authorization is given by the pSvc component 120. Using OEK_P as an example, before the pSvc component 120 authorizes the retrieval of the object entity, the OEK_P is encrypted using the public key of the pSvc component 120. When the pSvc component 120 authorizes the retrieval of the object entity, the pSvc component 120 decrypts the OEK_P using its private key. Then, the pSvc component 120 can re-encrypt the OEK_P using the public key of the oSvc component 130.

The oSvc component 130 can decrypt the encrypted key splits using its private key. For example, the oSvc component 130 can decrypt the object entity key splits OEK_O and OEK_P, the bibliographic entity key splits BEK_O and BEK_P, and/or the existence entity key splits EEK_O and EEK_P. Further, the oSvc component 130 can recover corresponding encryption keys, such as the OEK, the BEK, and/or the EEK, for example, using Eq. 7-9.

$$OEK = OEK\_O\ XOR\ OEK\_P \qquad (Eq.\ 7)$$

$$BEK = BEK\_O\ XOR\ BEK\_P \qquad (Eq.\ 8)$$

$$EEK = EEK\_O\ XOR\ EEK\_P \qquad (Eq.\ 9)$$

Then, the oSvc component 130 can decrypt the corresponding entities using the recovered encryption keys. For example, the oSvc component 130 can decrypt the object entity using OEK, decrypt the bibliographic entity using BEK, and/or decrypt the existence entity using the EEK. Further, the oSvc component 130 can send the decrypted entities to the uSvc component 110.

The oSvc component 130 can be implemented in various ways, such as a hardware element within a computer, software instructions executed by a computer, and the like. In an embodiment, the oSvc component 130 can be implemented in a computer that does not include the pSvc component 120 or the uSvc component 110. It is noted that the oSvc component 130 can include multiple storage locations distributed, for example, in different computers.

The sSvc component 140 is a trusted service that, with the cooperation of the pSvc 120, provides cross domain searching capability. Communication between the sSvc component 140 and the rest of the cross domain system 100 can be protected in accordance with suitable policy, e.g., via the HAIPE channels and/or public key cryptography. The sSvc component 140 can act in response to uploading requests and search requests.

In an uploading example, the sSvc component 140 can update a hash table. More specifically, the sSvc component 140 can receive a search entry corresponding to a composite object structure. In an embodiment, the sSvc component 140 can receive the search entry from the oSvc component 130. In another embodiment, the oSvc component 130 sends the search entry to the uSvc component 110, and the uSvc component 110 sends the search entry to the sSvc component 140. The search entry includes an object identification, metadata, a first set of key splits encrypted using the public key of the pSvc component 120, and a second set of key splits encrypted using the public key of the oSvc component 130. In an example, the metadata includes keywords for the object entity, keywords for the bibliographic entity, keywords for the existence entity, and the access restrictions. Further, the sSvc component 140 can use any suitable storage mechanism to store the keywords, the access restrictions, the first set and the second set of encrypted key splits in association with the object identification. In addition, the sSvc component 140 can update the hash table with the keywords, and associate the keywords to the object identification.

In a search example, the sSvc component 140 can receive a search request. The search request can include a search criteria, a digitally signed search authorization assertion from the pSvc component 120, and a digitally signed user authentication assertion from the uSvc component 110.

The sSvc component 140 can check the validity of the search request. In an embodiment, the sSvc component 140 does not process the search request when the search request does not include the digitally signed search authorization assertion from the pSvc component 120. In another embodiment, the sSvc component 140 does not process the search request when the search request does not include the digitally signed user authentication assertion from the uSvc component 110. In another embodiment, the sSvc component 140 does not process the search request when the search request does not include a virus-checked certification.

Then, the sSvc component 140 can compare the search criteria with the hashed keywords. In an embodiment, the sSvc component 140 can generate a provisional hit list based on matching the search criteria with the keywords in the hash table. Further, the sSvc component 140 can generate a hit list by filtering the provisional hit list based on the user credential in the user authentication assertion. More specifically, when the user credential in the user authentication assertion matches the access restrictions for an entity, the entity is kept. When the user credential in the user authentication assertion does not match the access restrictions for an entity, the entity is removed. In an example, when the user is entitled an object level of access, the object entity, the bibliographic entity and the existence entity are kept in the hit list. When the user is entitled a bibliographic level of access, the object entity is remove from the hit list, but the bibliographic entity and the existence entity are kept in the hit list. When the user is entitled an existence level of access, the existence entity is kept on the list, but the object entity and the bibliographic entity are removed from the hit list. The sSvc component 140 can digitally signed the hit list, and send the digitally signed hit list along with search request to the uSvc component 110.

The sSvc component 140 can be implemented in various ways, such as a hardware element within a computer, software instructions executed by a computer, and the like.

The kSvc component 150 is a trusted service that provides various encryption keys to the CDD system 100. Communication between the kSvc component 150 and the rest of the CDD system 100 can be protected in accordance with suitable policy, such as the HAIPE channels.

The kSvc component 150 can receive a key request from the oSvc component 130. In response, the kSvc component 150 can provide encryption keys, such as the OEK, the BEK and the EEK, for entity encryptions. In addition, the kSvc component 150 can provide random numbers for generating key splits. In an embodiment, the OEK, the BEK, the EEK and the random numbers are unique for an object.

Figure 2:
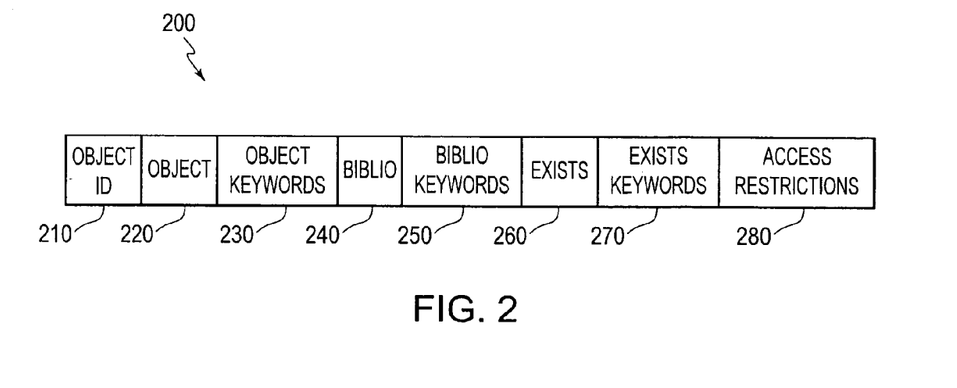
FIG. 2 shows a composite object structure 200 in a CDD system according to an embodiment of the disclosure.

FIG. 2 shows a composite object structure 200 in a CDD system according to an embodiment of the disclosure. The composite object structure 200 can be generated by a uSvc component 110 in the CDD system 100 based on an object uploaded in the CDD system 100. The composite object structure 200 can include an object identification 210, an object entity 220, object entity keywords 230, a bibliographic entity 240, bibliographic entity keywords 250, an existence entity 260, existence entity keywords 270, and access restrictions 280.

The object identification 210 can be a random number or a pseudo random number. In an embodiment, the object identification 210 can be a 64-bit random number that is generated by the uSvc component 110 for each object that is to be uploaded into the CDD system 100. In an embodiment, the CDD system 100 can include multiple uSvc components 110 distributed in multiple user terminals, such as work stations. Due to the reason that the object identification 210 is a random number, the multiple uSvc components 110 can work independently from any central number repository. When there is an object identification collision, which is rare for 64-bit randoms, the oSvc component 130 can detect the collision and request that the corresponding uSvc component 110 to generate a new object identification.

The object entity 220 can be the object itself, e.g., a file. The object entity 220 can be encrypted with the OEK and is available to a user whose credential qualifies for the object level of access.

The object entity keywords 230 can include keywords to the object entity 220. The keywords can be generated by the originator of the object. A reference to the object entity 220 is included in a hit list if the user's credential enables access to the object entity 220 and the search criteria matches keywords in the object entity keywords 230.

The bibliographic entity 240 includes bibliographic information of the object, such as title, author, date, publishing organization, contract number, and the like. The bibliographic entity 240 can be encrypted with the BEK and is available to a user whose credential qualifies for the bibliographic level of access.

The bibliographic entity keywords 250 can include keywords of the bibliographic entity 240. The keywords can be generated by the originator of the object. A reference to the bibliographic entity 240 can be included in the hit list if the user's credential enables access to the bibliographic entity 240 and the search criteria matches keywords in the bibliographic entity keywords 250.

The existence entity 260 can include a point-of-contact who may be contacted for information regarding the object. The existence entity 260 can be encrypted with the EEK and is available to a user whose credential qualifies for the existence level of access. A reference to the existence entity 260 in the hit list can indicate a confirmation that an object matching the search criteria exists.

The existence entity keywords 270 can include keywords added by the originator of the object. A reference to the existence entity 260 is included in the hit list if the user's credential enables the user to access the existence entity 260 and the search criteria matches the keywords in the existence entity keywords 270.

The access restrictions 280 can include various access restrictions defined by the originator of the object to access various entities of the object. The various access restrictions can be compared with a user's credential to determine whether the user has the object level of access, bibliographic level of access, existence level of access, or no access to the object. The access restrictions can be stated in terms of clearance level, special program caveats, nationality, country of representation, project membership, organizational membership, military service, government service, and the like.

In an embodiment, the object entity keywords 230, the bibliographic entity keywords 250, the existence entity keywords 270, and the access restrictions 280 can be referred as metadata.

Figure 3:
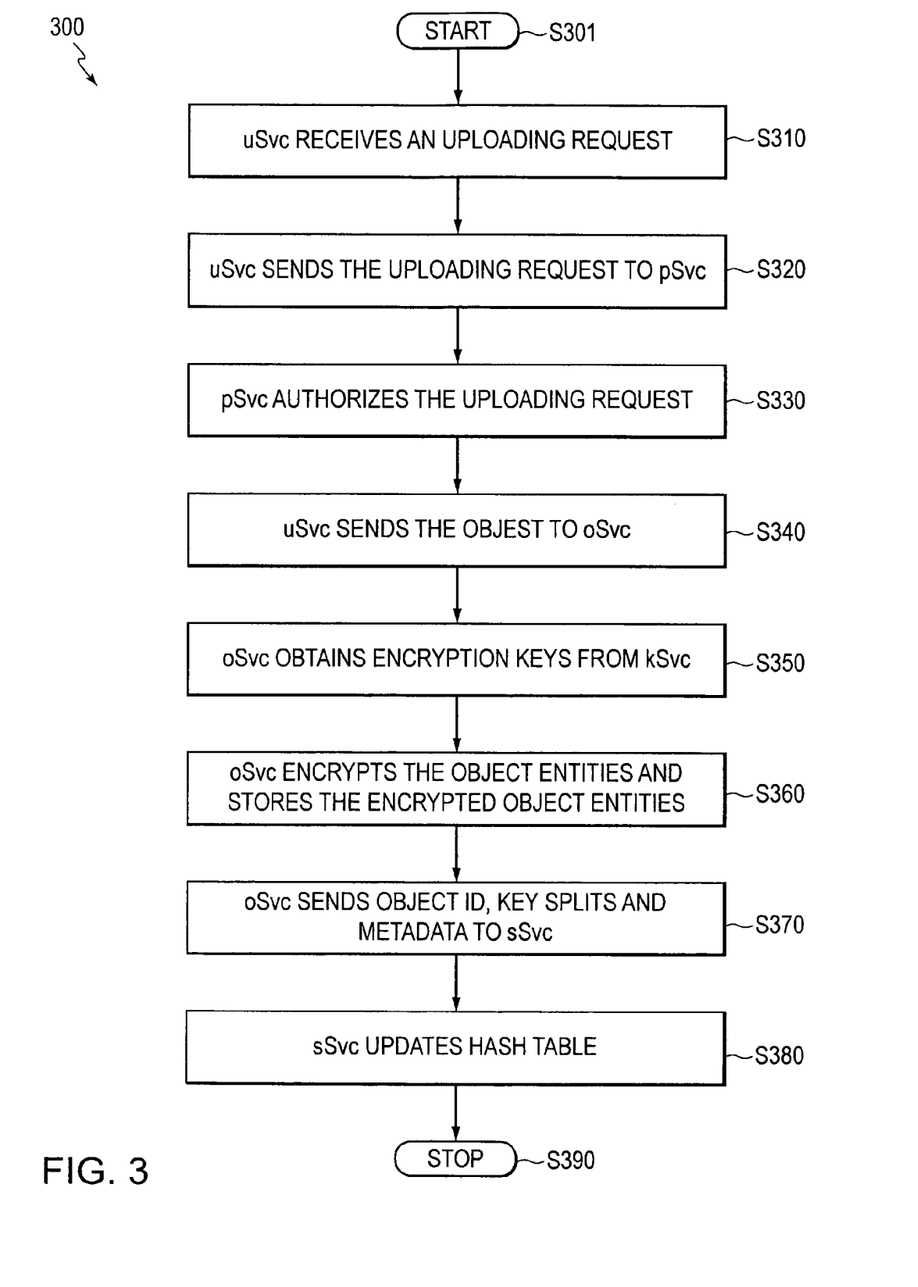
FIG. 3 shows an object uploading process 300 according to an embodiment of the disclosure.

FIG. 3 shows an object uploading process 300 according to an embodiment of the disclosure. The object uploading process starts from S301, and proceeds to S310.

At S310, the uSvc component 110 can receive an uploading request. In an example, a user can log into a user terminal having the uSvc component 110. The user can log into the user terminal based on a user credential. The uSvc component 110 can perform identification and authentication for the user, and can generate a user authentication assertion for the user based on the user credential. The user authentication assertion can indicate an access restriction level of the user. The user can create an object entry for an object (e.g., a file) and send an uploading request along with the object entry. The object entry can include various entities of the object, keywords for each entity, and access restrictions to the entities. In an example, the user can define an object entity, a bibliographic entity, and an existence entity in the object entry for the object. Further, the user can specify keywords for the object entity, keywords for the bibliographic entity, and keywords for the existence entity. In addition, the user can also define restrictions for object level of access, bibliographic level of access, and existence level of access. After the user define the entities, the keywords and the access restrictions, the user may initiate the uploading request from the user terminal. The user terminal can send the object entry and the uploading request to the uSvc component 110. The uSvc component 110 then acts on behalf the user. The process then proceeds to S320.

At S320, the uSvc component 110 sends the uploading request along with the object entry to the pSvc component 120. In addition, the uSvc component 110 can digitally sign the user authentication assertion, for example, by encrypting the user authentication assertion using the private key of the uSvc component 110, and sends the digitally signed user authentication assertion along with the uploading request and the object entry. It is noted that the uSvc component 110 and the pSvc component 120 can be coupled via a secure channel. The secure channel can use any suitable mechanism to protect data sent via the secure channel.

At S330, the pSvc component 120 compares the user authentication assertion with policy and makes a decision to approve or deny the uploading request. This uploading decision can be made based on various checks, such as a check on the user authentication assertion, a check on a virus-checked assertion, and the like.

Assuming an approved uploading request, the pSvc component 120 creates and digitally signs an uploading authorization assertion. The digitally signed uploading authorization assertion can include a user identity, the nature of the approved operation (e.g., uploading an object), a time period, and a decision. The pSvc component 120 can send the uploading authorization assertion to the uSvc component 110. The process then proceeds to S340.

At S340, the uSvc component 120 receives the uploading authorization assertion, generates an object identification, and constructs an object structure, for example, the composite object structure 200. The uSvc component 120 can digitally sign the composite object structure 200 and send the uploading request along with the uploading authorization assertion and the digitally signed composite object structure 200 to the oSvc component 130. In an embodiment, the uSvc component 120 and the oSvc component 130 can be coupled together via a secure channel. The secure channel can use any suitable mechanism to protect information being transmitted via the secure channel.

It is noted that after the composite object structure 200 has been transmitted to the oSvc component 130, the uSvc 110 may delete all the records about the composite object structure 200. The process then proceeds to S350.

At S350, the oSvc component 130 obtains encryption keys from the kSvc component 150. The oSvc component 130 receives the uploading request accompanied by the uploading authorization assertion and the digitally signed composite object structure 200, and can perform various checks on the received information before further processing the uploading request.

In an embodiment, the oSvc component 130 checks the uploading authorization assertion, for example, decrypting the digitally signed uploading authorization assertion using the public key of the pSvc component 120. The oSvc component 130 can be configured not to respond to an uploading request when the uploading request is not accompanied by a valid uploading authorization assertion signed by the pSvc component 120. In another embodiment, the oSvc component 130 checks the time period specified in the uploading authorization assertion. The oSvc component 130 can be configured not to respond to an uploading request that the current time falls outside the time period specified in the uploading authorization assertion.

The oSvc component 130 can check the object identification to detect possible object identification collisions. When the oSvc component 130 detects a potential object identification collision, the oSvc component 130 can notify the uSvc component 110 to send a new uploading request with a new object identification.

Further, the oSvc component 130 can request and obtain encryption keys from the kSvc component 150 for encrypting the composite object structure 200. In an example, the oSvc component 130 can obtain the OEK, the BEK and the EEK from the kSvc component 150. The OEK, the BEK and the EEK can be symmetric encryption keys. In addition, the oSvc component 130 can obtain three random numbers OEK_R, BEK_R, and EEK_R, from any suitable random number generator. In an embodiment, the oSvc component 130 obtains the three random numbers from the kSvc component 150. The three random numbers OEK_R, BEK_R, EEK_R can have same length as corresponding encryption keys. In an embodiment, the encryption keys and the corresponding random numbers are unique for each object. The process then proceeds to S360.

At S360, the oSvc component 130 encrypts the object entity 220 with the OEK, encrypts the bibliographic entity 240 with the BEK, and encrypts the existence entity 260 with the EEK. The metadata includes the object entity keywords 230, the bibliographic entity keywords 250, the existence entity keywords 270 and the access restrictions 280. It is noted that the oSvc component 130 does not encrypt the object identification.

Then, the oSvc component 130 can store the encrypted composite object structure. It is noted that the oSvc component 130 may store the encrypted composite object structure in multiple distributed storage locations.

In addition, the oSvc component 130 can generate key splits for the encryption keys using the random numbers. In an embodiment, for each encryption key, the oSvc component 130 can generate a pSvc key split and an oSvc key split. For example, the oSvc component 130 generates OEK_P and OEK_O for the OEK, generates BEK_P and BEK_O for the BEK, and generates EEK_P and EEK_O for the EEK according to Eq. 1-Eq. 6. Then, the oSvc component 130 can zeroize the three encryption keys (OEK, BEK, EEK) that were used to encrypt entities of the composite object structure 200. Further, the oSvc component 130 can encrypt the set of pSvc key splits (OEK_P, BEK_P, EEK_P) with the public key of the pSvc component 120. The oSvc can encrypt the set of oSvc key splits (OEK_O, BEK_O, EEK_O) with the public key of the oSvc component 130. Then, the oSvc component 130 zeroizes the set of pSvc key splits (OEK_P, BEK_P, EEK_P) and the set of oSvc key splits (OEK_O, BEK_O, EEK_O). The process proceeds to S370.

At S370, the oSvc component 130 sends a search entry to the sSvc component 140. The search entry can include the object identification, the metadata, the set of encrypted pSvc key splits and the set of encrypted oSvc key splits. The object identification is plaintext, and is not encrypted. It is noted that the sSvc component 140 needs the metadata for searching and the object identification to identify a hit entry in a hit list. The sSvc component 140 does not need the key splits for searching. However, the key splits can enable decrypting a selected hit entry in the hit list. The process proceeds to S380.

At S380, the sSvc component 140 receives the search entry and updates a hash table. The search entry includes the plaintext object identification, the metadata, the set of oSvc key splits and the set of pSvc key splits. The metadata includes the keywords and the access restrictions. The sSvc component 140 stores the metadata, the set of oSvc key splits and the set of pSvc key splits in association with the object identification. The sSvc component 140 uses the keywords to update the hash tables used for searching. It is noted that the sSvc component 140 does not hold the entities of the object.

It is also noted that when the sSvc component 140 has successfully updated the hash table, the sSvc component 140 can send a confirmation to the uSvc component 110. The uSvc component 110 can forward the confirmation to the user. Then, the process proceeds to S390 and terminates.

Figure 4:
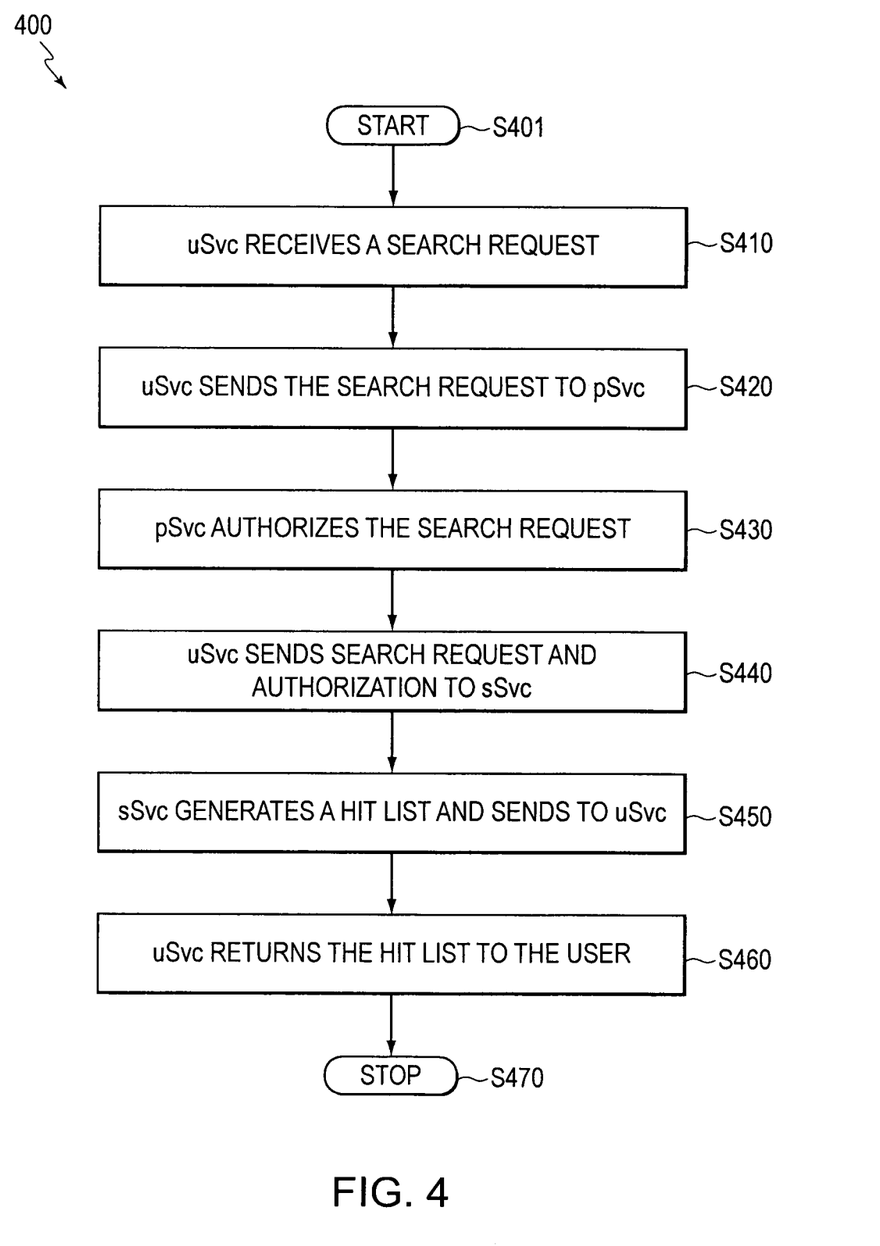
FIG. 4 shows a search process 400 according to an embodiment of the disclosure.

FIG. 4 shows a search process 400 according to an embodiment of the disclosure. The process starts from S401, and proceeds to S410.

At S410, the uSvc component 110 receives a search request from a user. The search request includes a search criteria. The process proceeds to S420.

At S420, the uSvc component 110 can forward the search request to the pSvc along with the digitally signed user authentication assertion. In an embodiment, the uSvc component 110 performs virus checking on the search criteria and includes a virus-checked certification in the search request. The process proceeds to S430.

At S430, the pSvc component 120 receives the search request along with the digitally signed user authentication assertion from the uSvc component 110. The pSvc component 120 can compare the user authentication assertion and the search request with current search policy and make a search decision. The search decision can be made based on the user's credentials. In addition, the search decision can be made based on other suitable condition. In an embodiment, the search decision may be based on an existence of a virus-checked assertion with the search request. In another embodiment, the search decision is based upon a comparison of the search criteria with acceptable keyword lists and dirty word lists.

Then, the pSvc component 120 can create and return to the uSvc component 110 a digitally signed search authorization assertion that permits, denies or modifies the search request. In an embodiment, the search authorization assertion specifies a time period during which the search needs to be accomplished. The process then proceeds to S440.

At S440, the uSvc component 110 receives the search authorization assertion, and forward the search request along with the search authorization assertion, and the user authentication assertion to the sSvc component 140. It is noted that the search authorization assertion can be digitally signed by the pSvc component 120, and the user authentication assertion can be digitally signed by the uSvc component 110. The process then proceeds to S450.

At S450, the sSvc component 140 receives the search request, the digitally signed search authorization assertion, and the digitally signed user authentication assertion from the uSvc component 110. The sSvc component 140 can check the validity of the received information before responding to the search request. In an embodiment, the sSvc component 140 checks the search authorization assertion, for example, by decrypting the digitally signed search authorization assertion using the public key of the pSvc component 120. The sSvc component 140 can be configured not to process a search request that is not accompanied by a valid search authorization assertion signed by the pSvc component 120. In another embodiment, the sSvc component checks the user authentication assertion, for example, by decrypting the digitally signed user authentication assertion using the public key of the uSvc component 110. The sSvc component 140 can be configured not to process a search request that is not accompanied with a valid user authentication assertion signed by the uSvc component 110.

In another embodiment, the sSvc component 140 checks the search request for the virus-checked certification. The sSvc component 140 can be configured not to process a search request that does not include a virus-checked certification.

Then, the sSvc component 140 can construct a hit list based on the credential of the user and the matching of the search criteria in the search request with the keywords in the hash table. In an embodiment, the sSvc component 140 can construct a provisional hit list by comparing the search criteria with the keywords in the hash table, and then generate the hit list by filtering the provisional hit list based on the credential of the user.

To generate the provisional hit list, the sSvc component 140 can compare the search criteria with the keywords in the hash table according to the search request. The search request may include search options specified by the user, and the sSvc component 140 can perform the comparison accordingly. In an embodiment, the search request may specify exact matches. In another embodiment, the search request may specify matching any word or matching all words. In another embodiment, the search request may include a default search option, such as matching any word, when the user does not specify the search options.

When the search criteria matches a keyword, a hit entry can be created in the provisional hit list. The hit entry can include a reference to an object. In an example, the hit entry may include an object identification of the object, an indication of an entity, access restrictions for the entity, key splits for the entity, and the like.

To generate the hit list, the sSvc component 140 can compare the user's credentials in the user authentication assertion with the access restrictions for each hit entry in the provisional hit list, and filter the provisional hit list. For example, when the user's credential indicates object level of access to an object having a hit entry in the provisional hit list, the hit entry can be kept in the hit list. When the user's credential indicates bibliographic level of access to an object having a hit entry in the provisional hit list, the hit entry is kept in the hit list if the entry is for the bibliographic entity of the object or for the existence entity of the object. However, if the hit entry is for the object entity of the object, the hit entry is removed from the hit list. When the user's credential indicates existence level of access to an object having a hit entry in the provisional hit list, the hit entry is kept in the hit list if the hit entry is to the existence entity of the object. However, if the hit entry is to the object entity of the object or to the bibliographic entity of the object, the hit entry is removed from the hit list.

The sSvc component 140 can then digitally sign the filtered hit list and send the digitally signed hit list, along with the associated search request, to the uSvc component 110. The process proceeds to S460.

At S460, the uSvc component 110 receives the signed hit list, filters out the key splits information in the hit entries, sends the filtered hit list to the user. In addition, the uSvc component 110 can keep the key splits information. Thus, the key splits information can be hidden from being accessed by the user. The process then proceeds to S470 and terminates.

Figure 5:
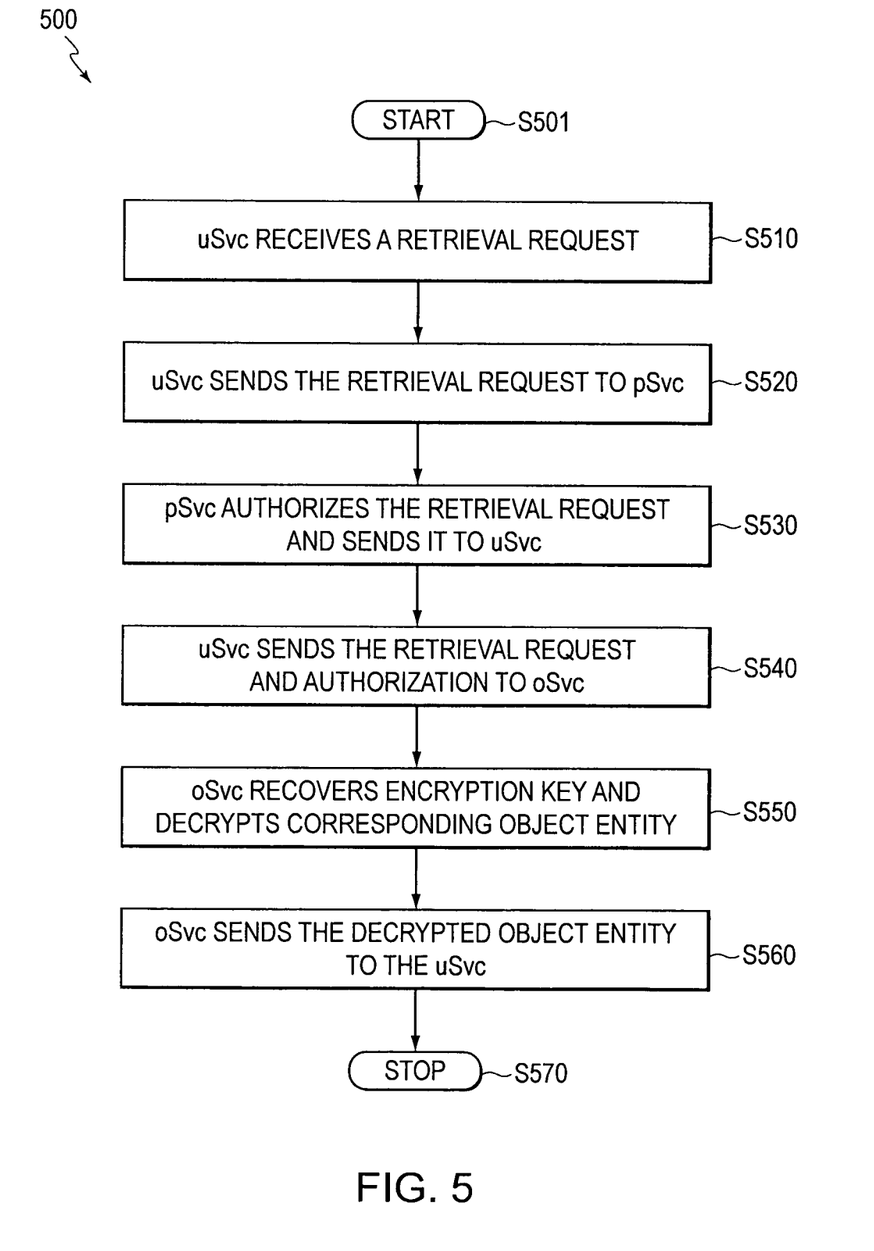
FIG. 5 shows a retrieval process 500 according to an embodiment of the disclosure.

FIG. 5 shows a retrieval process 500 according to an embodiment of the disclosure. The process starts S501, and proceeds to S510.

At S510, uSvc component 110 receives a retrieval request. For example, the user selects a hit entry from the hit list being provided on the user terminal. The user terminal can initiate a retrieval request to the uSvc component 110 for retrieving the selected hit entry. The process proceeds to S520.

At S520, the uSvc component 110 can process the retrieval request and send the processed retrieval request to the pSvc component 120. In an embodiment, the hit entry being provided to the user can include an object identification and encrypted access restrictions. The object identification and the encrypted metadata can be included in the retrieval request. Further, the uSvc component 110 can locate the stored key splits information in association with the selected hit entry, and include the key splits information in the retrieval request. In addition, the uSvc component 110 can include the user authentication assertion in the retrieval request. It is noted that the uSvc component 110 can digitally sign the user authentication assertion. It is also noted that the processed retrieval request can be sent via a secure channel, for example, using public key cryptography. The process then proceeds to S530.

At S530, the pSvc component 120 receives the retrieval request and sends an authorization back to the uSvc component 110. The retrieval request includes the object identification, the access restrictions, and the key splits. The pSvc component 120 can decrypt the access restrictions. In another embodiment, the pSvc component 120 can check the user authentication assertion, for example, by decrypting the digitally signed user authentication assertion using the public key of the uSvc component 110.

The pSvc component 120 can make a retrieval decision to permit, deny or modify the retrieval request. The retrieval decision is made based upon the user's credentials, the access restrictions, and the retrieval policy being held by the pSvc component 120. It is noted that the retrieval decision can be made based on other suitable condition.

When the retrieval decision indicates that the user can obtain one or more entities of the object, the pSvc component 120 can decrypt the appropriate key splits. In an example, when the retrieval decision indicates that the user can obtain the object entity of the object, the pSvc component 120 can decrypt the OEK_P using the private key of the pSvc component 120, and can re-encrypt the OEK_P using the public key of the oSvc component 130. Similarly, when the retrieval decision indicates that the user can obtain the bibliographic entity of the object, the pSvc component 120 can decrypt the BEK_P using the private key of the pSvc component 120, and can re-encrypt the BEK_P using the public key of the oSvc component 130; and when the retrieval decision indicates that the user can obtain the existence entity of the object, the pSvc component 120 can decrypt the EEK_P using the private key of the pSvc component 120, and can re-encrypt the EEK_P using the public key of the oSvc component 130. The re-encrypted key splits can be included in the retrieval request to replace the corresponding old key splits.

The pSvc component 120 can create a retrieval authorization assertion that permits, denies or modifies the retrieval request. In an embodiment, the retrieval authorization assertion specifies a time period during which the retrieval needs to be completed. In addition, the pSvc component 120 can digitally sign the retrieval authorization assertion, and send the digitally signed retrieval authorization assertion along with the retrieval request back to the uSvc component 110. It is noted that the retrieval request has been updated with the re-encrypted key splits for entities that the retrieval request has been granted. The process then proceeds to S540.

At S540, the uSvc component 110 receives the digitally signed retrieval authentication assertion along with the retrieval request and forwards the retrieval authentication assertion and the retrieval request with a digitally signed user authentication assertion to the oSvc component 130.

At S550, the oSvc component 130 receives the digitally signed retrieval authorization assertion, the retrieval request and the digitally signed user authentication assertion, recovers suitable encryption keys and decrypts suitable entities.

The oSvc component 130 can check the received information before further actions in response to the retrieval request. In an example, the oSvc component 130 can check the retrieval authorization assertion, for example, by decrypting the digitally signed retrieval authorization assertion with the public key of the pSvc component 120. In an embodiment, the oSvc component 130 does not process the retrieval request if the retrieval authorization assertion is not signed by the pSvc component 120.

In another example, the oSvc component 130 can check the user authentication assertion, for example, by decrypting the digitally user authentication assertion with the public key of the uSvc component 110. In an embodiment, the oSvc component 130 does not process the retrieval request if the user authentication assertion is not signed by the uSvc component 110.

In another example, oSvc component 130 can check the time period specified in the retrieval authorization assertion. In an embodiment, the oSvc component 130 does not process the retrieval request when the current time falls outside the time period specified in the retrieval authorization assertion.

The oSvc component 130 can recover the encryption keys to entities that retrieval to the entities has been granted. When the retrieval to an entity is permitted, the retrieval request can include recoverable key splits for the encryption key of the entity. For example, when the retrieval to the object entity of the object is permitted, the retrieval request can include OEK_P and OEK_O that are both encrypted by the public key of the oSvc component 130. The oSvc component 130 can decrypt the OEK_P and the OEK_O using its private key, and can recover the OEK, for example, according to Eq. 7. Similarly, when the retrieval to the bibliographic entity of the object is permitted, the retrieval request can include BEK_P and BEK_O that are both encrypted by the public key of the oSvc component 130. The oSvc component 130 can decrypt the BEK_P and the BEK_O using its private key, and can recover the BEK, for example, according to Eq. 8; and when the retrieval to the existence entity of the object is permitted, the retrieval request can include EEK_P and EEK_O that are both encrypted by the public key of the oSvc component 130. The oSvc component 130 can decrypt the EEK_P and the EEK_O using its private key, and can recover the EEK, for example, according to Eq. 9.

Further, the oSvc component 130 can obtain the stored composite object structure corresponding to the object identification, and use the recovered encryption key to decrypt the corresponding entity. In an embodiment, after the corresponding entity has been successfully decrypted, the oSvc component 130 zeroizes all of the key information used to decrypt the entity. Then, the process proceeds to S560.

At S560, the oSvc component 130 sends the decrypted entity to the uSvc component 110. The uSvc component 130 receives decrypted entity, and forwards the plaintext version of the decrypted entity to the user, for example, onto a display of the user terminal.

In an embodiment, the retrieval process 500 can be combined with the search process 400. For example, after S450, the uSvc component 110 receives the hit list. For each hit entry in the hit list, the uSvc component 110 can retrieve corresponding entities, for example, according to S520-S560. The uSvc component 110 can extend each hit entry with the retrieved corresponding entity, and present the extended hit list to the user.

Figure 6A:
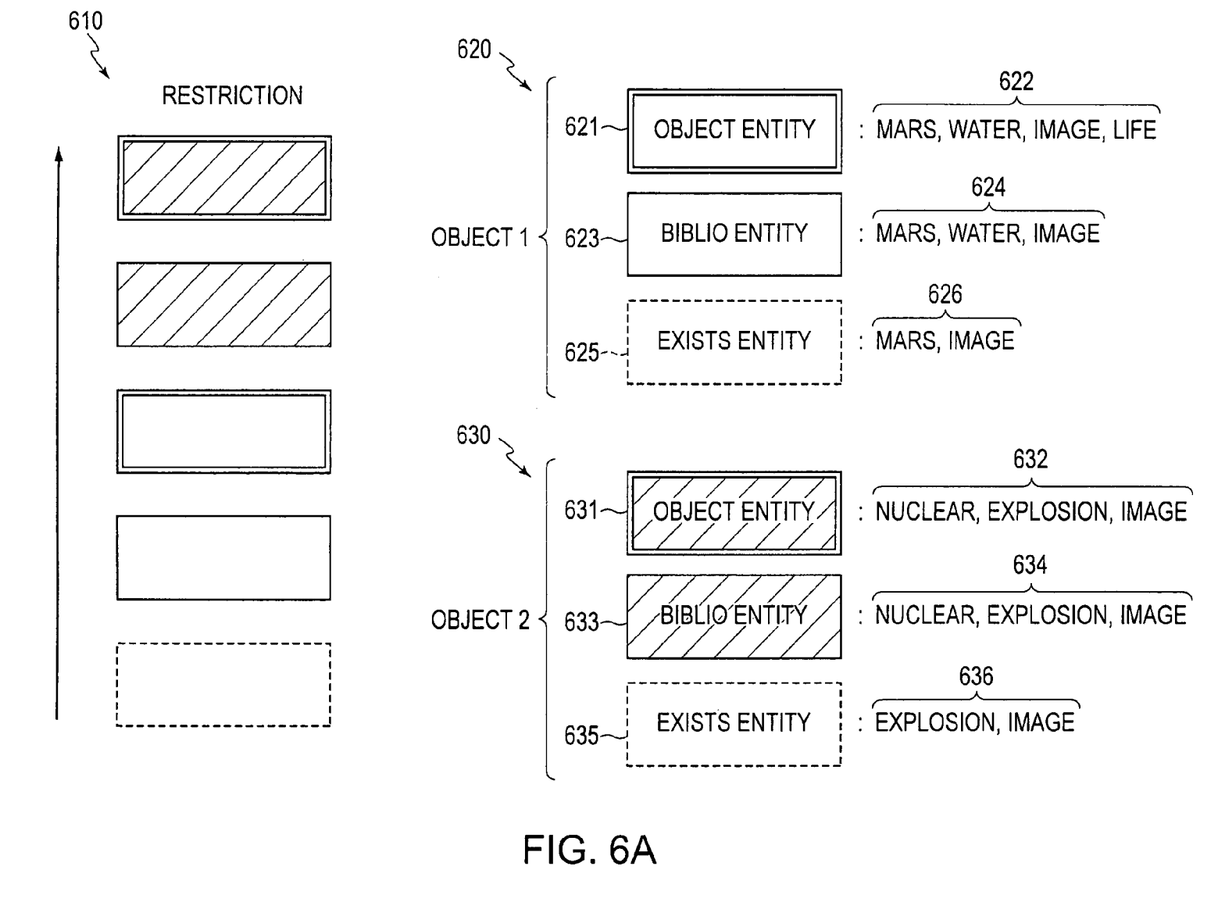
FIGS. 6A and 6B show a search example in a CDD system according to an embodiment of the disclosure.

FIG. 6A shows an example of two objects stored in a CDD system according to an embodiment of disclosure. Restriction 610 shows 5 restriction levels used in the example. Object 1 is stored as a composite object structure 620, and object 2 stored as a composite object structure 630.

The composite object structure 620 includes an object entity 621, a bibliographic entity 623, and an existence entity 625. Further, the composite object structure 620 includes object entity keywords 622, bibliographic entity keywords 624, and existence entity keywords 626. In addition, access restrictions of the object entity 621, the bibliographic entity 623 and the existence entity 625 are shown according to restriction 610.

The composite object structure 630 includes an object entity 631, a bibliographic entity 633, and an existence entity 635. Further, the composite object structure 630 includes object entity keywords 632, bibliographic entity keywords 634, and existence entity keywords 636. In addition, access restrictions of the object entity 631, the bibliographic entity 633 and the existence entity 635 are shown according to restriction 610.

Figure 6B:
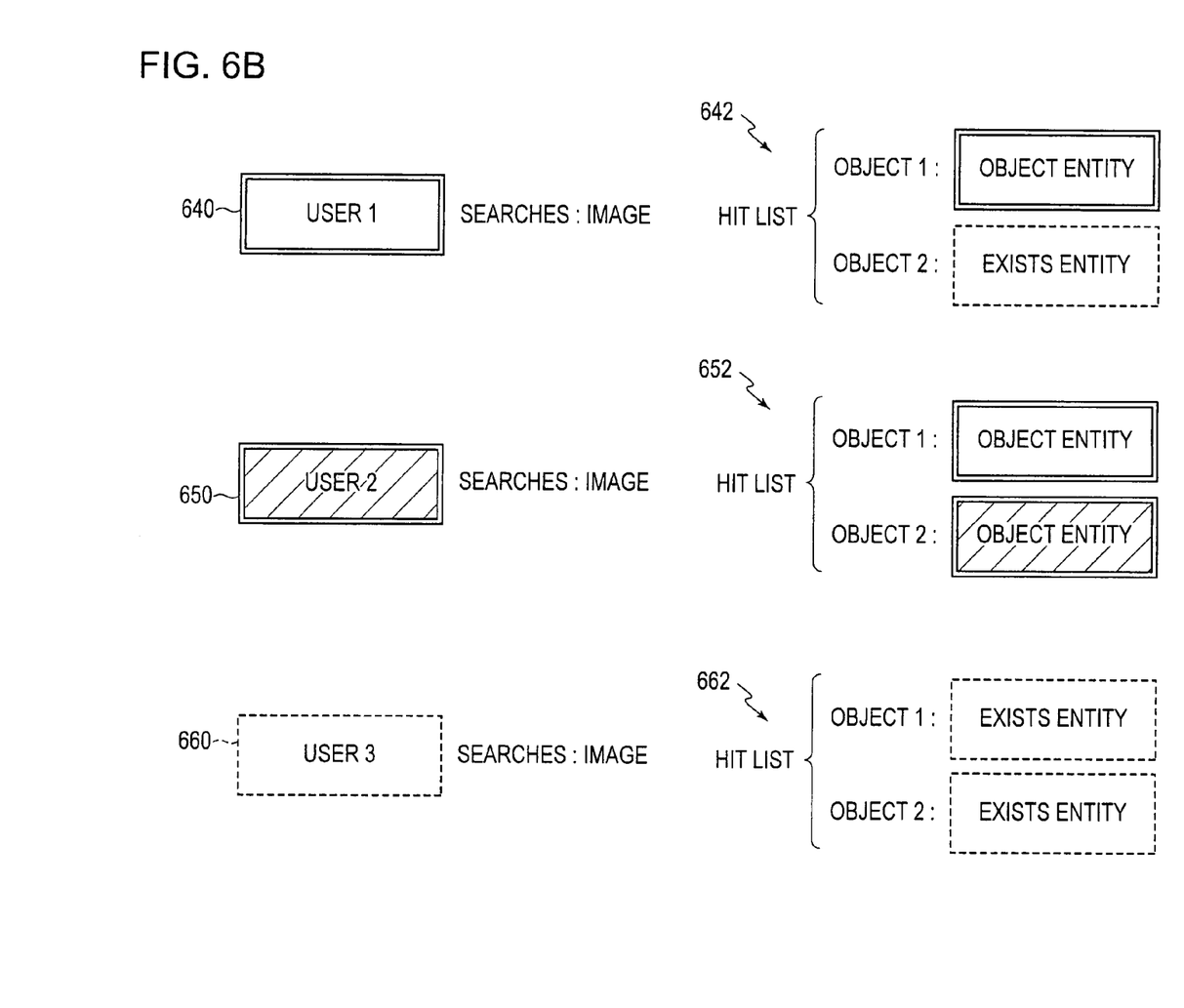

FIG. 6B shows that three users having different levels of access conduct searches having a same search criteria. The levels of access for user 1, user 2 and user 3 are respectively shown by 640, 650 and 660 in accordance with restriction 610. User 1, user 2 and user 3 submit the same search criteria "image." Search results are shown based on the two composite object structures 620 and 630 shown in FIG. 6A.

The search result for user 1 is shown by a hit list 642. The hit list 642 can include the object entity of object 1, and the existence entity of object 2. The search result for user 2 is shown by a hit list 652. The hit list 652 can include the object entity of object 1, and the object entity of object 2. The search result for user 3 is shown by a hit list 662. The hit list 662 can include the existence entity of object 1, and the existence entity of object 2.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for searching, comprising:
uploading an object into a cross domain discovery system that includes a plurality of user service components:
generating a composite object structure of the uploaded object by one of the user service components, the composite object structure including an object identification that is a random number;
detecting an object identification collision by the one of the user service components and generating a new object identification of the composite object structure;
storing, by an object service component, first keywords in association with a first entity of the object, and second keywords in association with a second entity of the object by a search service component, the first entity having a first restriction level and the second entity having a second restriction level, one of the first and second entities is an existing entity that has at least information of a person to contact for the object, wherein storing the first keywords and second keywords further comprises:
encrypting the first entity using a first symmetric key;
storing the encrypted first entity in the object service component;
encrypting the second entity using a second symmetric key;
storing the encrypted second entity in the object service component;
obtaining the first symmetric key and the second symmetric key in association with the object;
splitting the first symmetric key into a first key split and a second key split; and
splitting the second symmetric key into a third key split and a forth key split;
determining a search request having the first restriction level matching the first keywords by the search service component; and
responding to the search request with the first entity.

2. The method of claim 1, wherein storing the first keywords in association with the first entity and the second keywords in association with the second entity by the search service further comprises:
storing the first keywords and the second keywords in a hash table.

3. The method of claim 1, further comprising:
determining the search request being authorized by a policy service component.

4. The method of claim 1, further comprising:
determining the search request having the first restriction level based on a credential of an originator of the search request.

5. The method of claim 1, wherein responding to the search request with the first entity further comprises:
creating a hit entry including a reference to the object stored in an object service component.

6. A method for searching, comprising:
uploading an object into a cross domain discovery system that includes a plurality of user service components;
generating a composite object structure of the uploaded object by one of the user service components, the composite object structure including an object identification that is a random number;
detecting an object identification collision by the one of the user service components and generating a new object identification of the composite object structure;
storing the object, by an object service component, having a first entity with a first restriction level and a second entity with a second restriction level in the object service component, one of the first and second entities is an existing entity that has at least information of a person to contact for the object, wherein storing the object further comprises:
encrypting the first entity using a first symmetric key;
storing the encrypted first entity in the object service component;
encrypting the second entity using a second symmetric key;
storing the encrypted second entity in the object service component;
obtaining the first symmetric key and the second symmetric key in association with the object;
splitting the first symmetric key into a first key split and a second key split; and
splitting the second symmetric key into a third key split and a forth key split;
transmitting first keywords in association with the first entity and second keywords in association with the second entity to a search service component, wherein the search service component stores the first keywords and the second keywords, determines a search request having the first restriction level matching the first keywords and creates a hit entry including a reference to the first entity stored in the object service component.

7. The method of claim 6, further comprising:
encrypting the first key split and the third key split using a public key of a first asymmetric key pair belonging to the object service component; and
encrypting the second key split and the fourth key split using a public key of a second asymmetric key pair belonging to the policy service.

8. The method of claim 7, further comprising:
transmitting the encrypted first key split, the encrypted second key split, the encrypted third key split and the encrypted fourth key split to the search service component; and
deleting the first key split, the second key split, the third key split and the fourth key split.

9. The method of claim 7, further comprising:
decrypting the encrypted first key split using a private key of the first asymmetric key pair belonging to the object service component.

10. The method of claim 7, further comprising:
receiving a re-encrypted second key split, wherein the re-encrypted second key split is generated by decrypting the encrypted second key split using a private key of the second asymmetric key pair belonging to the policy service, and re-encrypting the second key split using the public key of the first asymmetric key pair belonging to the object service component; and
decrypting the re-encrypted second key split using a private key of the first asymmetric key pair belonging to the object service component.

11. The method of claim 10, further comprising:
combining the decrypted first key split and the decrypted second key split to recover the first symmetric key; and
decrypting the encrypted first entity using the recovered first symmetric key.

12. A system for cross domain discovery, comprising:
a microprocessor configured to execute instructions of the user service component of the system;
a plurality of user service components of the system, an object being uploaded into the system, each of user service components configured to generate a composite object structure of the uploaded object, the composite object structure including an object identification that is a random number, to detect an object identification collision, and to generate a new object identification of the composite object structure;
an object service component configured to store an object having a first entity with a first restriction level and a second entity with a second restriction level, one of the first and second entities is an existing entity that has at least information of a person to contact for the object;
a search service component configured to store first keywords in association with the first entity, and second keywords in association with the second entity, determine a search request having the first restriction level matching the first keywords, and respond to the search request with the first entity stored in the object service component;
a policy service component configured to authorize the search request; and
a key service component configured to generate a first symmetric key and a second symmetric key in association with the object, wherein
the object service component is further configured to
encrypt the first entity using the first symmetric key;
encrypt the second entity using the second symmetric key;
split the first symmetric key into a first key split and a second key split; and
split the second symmetric key into a third key split and a forth key split;
encrypt the first key split and the third key split using a public key of a first symmetric key pair belonging to the object service component, and
encrypt the second key split and the forth key split using a public key of a second asymmetric key pair belonging to the policy service.

13. The system of claim 12, wherein the search service component further comprises:
a hash table configured to store at least one of the first keywords and the second keywords.

14. The system of claim 12, wherein each service component is further configured to receive the search request from a user, and associate a credential of the user with the search request.

15. The system of claim 12, wherein the object service component is configured to
transmit the encrypted first key split, the encrypted second key split, the encrypted third key split and the encrypted fourth key split to the search service component; and
delete the first key split, the second key split, the third key split and the fourth key split.

16. The system of claim 12, wherein the object service component is further configured to
- decrypt the encrypted first key split using a private key of the first asymmetric key pair belonging to the object service component,
- receive a re-encrypted second key split, wherein the re-encrypted second key split is generated by decrypting the encrypted second key split using a private key of the second asymmetric key pair belonging to the policy service, and re-encrypting the second key split using the public key of the first asymmetric key pair belonging to the object service component,
- decrypt the re-encrypted second key split using the private key of the first asymmetric key pair belonging to the object service component,
- combine the decrypted first key split and the decrypted second key split to recover tile first symmetric key, and
- decrypt the encrypted first entity using the recovered first symmetric key. and re-encrypting the second key split using the public key of the first asymmetric key pair belonging to the object service component,
- decrypt the re-encrypted second key split using the private key of the first asymmetric key pair belonging to the object service component,
- combine the decrypted first key split and the decrypted second key split to recover tile first symmetric key, and
- decrypt the encrypted first entity using the recovered first symmetric key.

* * * * *